United States Patent
Pass et al.

(10) Patent No.: US 10,173,847 B2
(45) Date of Patent: Jan. 8, 2019

(54) SYSTEM FOR OVERTURNING PLATE-SHAPED BODIES

(71) Applicant: SMS GROUP GMBH, Düsseldorf (DE)

(72) Inventors: Gisbert Pass, Düsseldorf (DE); Frank Werner, Düsseldorf (DE); Michael Riediger, Düsseldorf (DE)

(73) Assignee: SMS GROUP GMBH, Düsseldorf (DE)

( * ) Notice: Subject to any disclaimer, the term of this patent is extended or adjusted under 35 U.S.C. 154(b) by 0 days.

(21) Appl. No.: 15/531,246

(22) PCT Filed: Oct. 27, 2015

(86) PCT No.: PCT/EP2015/074790
§ 371 (c)(1),
(2) Date: May 26, 2017

(87) PCT Pub. No.: WO2016/083046
PCT Pub. Date: Jun. 2, 2016

(65) Prior Publication Data
US 2017/0326606 A1    Nov. 16, 2017

(30) Foreign Application Priority Data

Nov. 28, 2014    (DE) .................. 10 2014 224 364

(51) Int. Cl.
*B21B 39/20*    (2006.01)
*B21B 39/32*    (2006.01)
(Continued)

(52) U.S. Cl.
CPC ............ *B65G 47/252* (2013.01); *B21B 39/32* (2013.01); *B21B 1/38* (2013.01); *B21B 2001/028* (2013.01)

(58) Field of Classification Search
CPC ... B21B 39/32; B21B 2001/028; B21B 39/22; B65G 47/252; B65G 47/248;
(Continued)

(56) References Cited

U.S. PATENT DOCUMENTS 1,904,434 A * 4/1933 Fisk ...................... B21B 43/003
198/402
2,235,832 A * 3/1941 Freeman .................. B23Q 7/05
193/36
(Continued)

FOREIGN PATENT DOCUMENTS

CN            2686802 Y       3/2005
CN          101754819 A       6/2010
(Continued)

OTHER PUBLICATIONS

Office Action in Chinese Application No. 2015800648924, dated Mar. 19, 2018.

*Primary Examiner* — Gregory W Adams
(74) *Attorney, Agent, or Firm* — Lucas & Mercanti, LLP; Klaus P. Stoffel

(57) ABSTRACT

A system for overturning plate-shaped bodies, in particular slabs and sheets, having at least one overturn arm pivotally arranged about a pivot axis and can be brought into physical contact with a flat side of a plate-shaped body to be overturned, and at least one other overturn arm pivotally arranged about another pivot axis and can be brought into physical contact with another flat side of the plate-shaped body to be overturned. The two pivot axes are parallel to each other and mutually spaced. A permanent system is provided for overturning plate-shaped bodies with different dimensions, wherein noise generation associated with the overturning process is greatly reduced using the system. The system has at least one drivable eccentric arrangement with (Continued)

which a position of one of the pivot axes can be adjusted before and/or during an overturning process.

10 Claims, 4 Drawing Sheets

(51) Int. Cl.
*F15B 15/06* (2006.01)
*B65G 47/252* (2006.01)
*B21B 1/38* (2006.01)
*B21B 1/02* (2006.01)

(58) Field of Classification Search
CPC ............... B65G 47/82; B65G 47/8846; B65H 2301/44716; B65H 2402/351
See application file for complete search history.

(56) References Cited

U.S. PATENT DOCUMENTS

| | | | | |
|---|---|---|---|---|
| 2,499,422 A | * | 3/1950 | Schmidt | B21D 51/2692 |
| | | | | 198/379 |
| 2,863,571 A | * | 12/1958 | Foley | D21J 1/08 |
| | | | | 414/567 |
| 3,286,854 A | * | 11/1966 | Crawford | B65G 47/82 |
| | | | | 198/412 |
| 3,581,910 A | * | 6/1971 | Field | B21B 39/223 |
| | | | | 198/403 |
| 3,678,781 A | * | 7/1972 | Rohrberg | B23K 9/0286 |
| | | | | 74/571.1 |
| 3,741,408 A | * | 6/1973 | Klusmier | B65G 47/8846 |
| | | | | 414/738 |
| 3,977,549 A | * | 8/1976 | Ettlinger, Jr. | A47L 15/247 |
| | | | | 414/425 |
| 5,291,984 A | * | 3/1994 | Lusetti | B65G 47/248 |
| | | | | 198/408 |
| 6,234,742 B1 | * | 5/2001 | Rodefeld | B41F 17/16 |
| | | | | 198/403 |
| 7,631,479 B2 | * | 12/2009 | Thier | A01D 34/62 |
| | | | | 56/249 |
| 8,439,625 B2 | | 5/2013 | Pass et al. | |
| 2010/0196133 A1 | | 8/2010 | Pass et al. | |
| 2011/0271735 A1 | * | 11/2011 | Plummer | B21D 7/024 |
| | | | | 72/455 |

FOREIGN PATENT DOCUMENTS

| | | | | |
|---|---|---|---|---|
| CN | 103909947 A | | 7/2014 | |
| DE | 2165936 A1 | * | 7/1973 | ............. B21B 39/32 |
| DE | 3123673 A1 | | 12/1982 | |
| DE | 102007054034 A1 | | 7/2008 | |
| EP | 2170536 B1 | | 9/2012 | |
| GB | 2099345 A | * | 12/1982 | ........... B21B 39/226 |
| JP | S5014227 B1 | | 5/1975 | |
| JP | S51118673 U | | 9/1976 | |
| JP | H0357410 U | | 6/1987 | |
| JP | S63278608 A | | 11/1988 | |
| JP | H0238111 U | | 3/1990 | |
| JP | 2000226113 A | * | 8/2000 | |
| JP | 2002046853 A | * | 2/2002 | |
| JP | 2002205109 A | * | 7/2002 | |
| JP | 2003276828 A | * | 10/2003 | |
| JP | 2004107064 A | | 4/2004 | |
| JP | 2010528872 A | | 8/2010 | |
| SU | 861066 A1 | * | 9/1981 | |

\* cited by examiner

SYSTEM FOR OVERTURNING PLATE-SHAPED BODIES

The present application is a 371 of International application PCT/EP2015/074790, filed Oct. 27, 2015, which claims priority of DE 10 2014 224 364.5, filed Nov. 28, 2014, the priority of these applications is hereby claimed and these applications are Incorporated herein by reference.

BACKGROUND OF THE INVENTION

The invention relates to a system for turning over plate-shaped bodies, in particular slabs and sheets, having at least one turnover device arm which is arranged so as to be pivotable about a pivot axis and which can be placed in physical contact with a flat side of a plate-shaped body to be turned over, and having at least one further turnover device arm which is arranged so as to be pivotable about a further pivot axis and which can be placed in physical contact with a further flat side of the plate-shaped body to be turned over, wherein the two pivot axes are arranged parallel to and spaced apart from one another.

The invention furthermore relates to a method for turning over plate-shaped bodies, in particular slabs and sheets, using a turnover system having at least one turnover device arm which is arranged so as to be pivotable about a pivot axis and which can be placed in physical contact with a flat side of a plate-shaped body to be turned over, and having at least one further turnover device arm which is pivotable about a further pivot axis and which can be placed in physical contact with a further flat side of the plate-shaped body to be turned over, wherein the two pivot axes are arranged parallel to and spaced apart from one another.

Slabs and sheets are inspected on both flat sides for the purposes of quality control and for any necessary reworking. For this purpose, a slab or a sheet is normally placed onto an inspection bed such that one of the two flat sides can be inspected. To be able to inspect the other flat side of the slab or the sheet, the slab or the sheet must be turned over.

For turning over sheets, use is normally made of sheet turnover devices. These normally have positionally fixedly held turnover device shafts on which turnover device arms are pivotably mounted. As a result, the turnover device arms have a spacing to one another which, owing to the construction, cannot be varied. This has the effect, in particular in the case of thin slabs and sheets, that the slab to be turned over, or the respective sheet to be turned over, turns over with an impact as a result of its own weight during the transfer from an input side to an output side of a sheet turnover device.

A sheet turnover device of said type is known for example from EP 2 170 536B1. Said sheet turnover device comprises transferring turnover device arms situated on one turnover device shaft and receiving turnover device arms situated on a further turnover device shaft. The turnover device arms mounted on the respective turnover device shaft are arranged so as to be pivotable about a common pivot axis, which is identical to a longitudinal central axis of the respective turnover device shaft. The turnover device shafts and thus the pivot axes defined by them are arranged parallel to one another and spaced apart from one another. To reduce operating noises and vibrations in a sheet during a transfer of the sheet from the transferring turnover device arms to the receiving turnover device arms, the turnover device shaft of the receiving turnover device arms is arranged offset in relation to the turnover device shaft of the transferring turnover device arms. Furthermore, on the receiving turnover device arms, there is arranged at least one damping plate by means of which a turnover impact of the sheet against the receiving turnover device arms during a turnover process is mechanically dampened.

DE 10 2007 054 034 A1 relates to an apparatus for turning over plate-shaped bodies of different thickness, having turnover device arms mounted pivotably on turnover device shafts. The turnover device arms are in each case arranged so as to be pivotable about a pivot axis which is identical to a longitudinal central axis of the respective turnover device shaft. The turnover device shafts and thus the pivot axes defined by them are arranged parallel to one another and spaced apart from one another. To be able to turn over plate-shaped bodies of different thickness, one of the turnover device arms is fed to the plate-shaped body arranged on the other turnover device arm with a possibly repeating sequence of reduction and increase of the spacing of said turnover device arm to the plate-shaped body.

DE 31 23 673 A1 discloses a reversible sheet turnover device having turnover device arms mounted pivotably at pivot axes, wherein the spacing of the two pivot axes to one another in a horizontal direction is variable.

SUMMARY OF THE INVENTION

It is an object of the invention to provide a more durable system for turning over plate-shaped bodies, in particular slabs and sheets, with different dimensions, by means of which system a generation of noise associated with the turnover process is substantially reduced, and damage to the plate-shaped bodies caused by the turnover process is substantially avoided.

The system according to the invention for turning over plate-shaped bodies, in particular slabs and sheets, comprises at least one turnover device arm which is arranged so as to be pivotable about a pivot axis and which can be placed in physical contact with a flat side of a plate-shaped body to be turned over, at least one further turnover device arm which is arranged so as to be pivotable about a further pivot axis and which can be placed in physical contact with a further flat side of the plate-shaped body to be turned over, wherein the two pivot axes are arranged parallel to and spaced apart from one another, and at least one driveable eccentric arrangement by means of which a position of one of the pivot axes can be adjusted before and/or during a turnover process.

According to the invention, the position of at least one pivot axis can be adjusted, in particular in continuous fashion, whereas the two pivot axes are arranged uninterruptedly parallel to one another. Through the use, according to the invention, of at least one eccentric arrangement for adjusting the position of the pivot axis, the position of the pivot axis can be adjusted on a circular path lying in a plane arranged perpendicular to the pivot axis. In this way, the bearing section, which acts about the pivot axis, of the turnover device arm which is arranged so as to be pivotable about the pivot axis can be raised, lowered, and moved toward the other pivot axis or away from the other pivot axis. Also, any desired intermediate positions of the pivot axis between vertical and horizontal extreme positions on the circular path are possible. During a bearing adjustment of the pivot axis, the position of the turnover device shaft itself remains unchanged.

By means of a movement of the pivot axis toward the other pivot axis or away from the other pivot axis, the spacing between the turnover device arm arranged so as to be pivotable about the pivot axis and a turnover device arm arranged so as to be pivotable about the other pivot axis can be varied, in particular in continuous fashion. In this way, the system can be adapted very precisely to the respective thickness of the plate-shaped body to be turned over. In this way, a turnover impact of the plate-shaped body during a transfer of the plate-shaped body from a turnover device arm arranged so as to be pivotable about one pivot axis to a turnover device arm arranged so as to be pivotable about the other pivot axis can be substantially avoided. This is associated with a substantial reduction of the generation of noise associated with the turnover process.

Through the substantial avoidance of the turnover impact of a plate-shaped body during the transfer thereof from a turnover device arm arranged so as to be pivotable about one pivot axis to a turnover device arm arranged so as to be pivotable about the other pivot axis by means of the system according to the invention, shocks and impacts in bearings of the system are substantially reduced. In this way, the service life of wearing components, in particular the bearings, is lengthened, whereby the system exhibits a longer service life than conventional turnover devices. This is furthermore associated with a reduction in maintenance costs and repair costs.

Through the substantial avoidance of the turnover impact of a plate-shaped body during the transfer thereof from a turnover device arm arranged so as to be pivotable about one pivot axis to a turnover device arm arranged so as to be pivotable about the other pivot axis by means of the system according to the invention, it is furthermore possible for vibrations in the plate-shaped body caused by the turnover impact, and an associated generation of noise, to be substantially reduced. Furthermore, damage caused to a flat side of the plate-shaped body as a result of the turnover impact can be substantially avoided.

The position of the pivot axis can be adjusted before and/or during a turnover process such that the spacing between the pivot axes arranged parallel to one another is, at least at the time of the transfer of a plate-shaped body from a turnover device arm arranged so as to be pivotable about one pivot axis to a turnover device arm arranged so as to be pivotable about the other pivot axis, optimally adapted to the respective thickness of the plate-shaped body. This adaptation of the spacing between the pivot axes may however also be performed already at an earlier point in time, for example before or at the start, of the turnover process. For the adaptation of the spacing between the pivot axes to different thicknesses of plate-shaped bodies to be turned over, an algorithm may be used and/or executed on a processor unit in order to realize a smooth and shock-free transfer of a plate-shaped body. Such an adaptation of the spacing between the pivot axes to different thicknesses of plate-shaped bodies to be turned over may also be performed during a turnover process.

The system according to the invention may be configured as a separate ("stand-alone") system or integrated into an in particular automatically operating inspection line for the inspection of plate-shaped bodies.

The turnover device arm which is arranged so as to be pivotable about one pivot axis may be pivotable independently of, or in a manner synchronized with, the turnover device arm which is arranged so as to be pivotable about the other pivot axis. A synchronization of the movements of turnover device arms which are arranged so as to be pivotable, in particular in opposite directions, about the pivot axes may be realized by means of a corresponding design of an electric, hydraulic or pneumatic drive device provided for said synchronous pivoting.

The system according to the invention may also have two or more turnover device arms which are arranged so as to be pivotable about one of the pivot axes. Said turnover device arms may be movable independently of one another or may be immovably coupled to one another by means of at least one connecting element.

For the adjustment of the position of one of the pivot axes before and/or during a turnover process, the system according to the invention may also have two or more eccentric arrangements which are driveable independently or in a synchronized manner. It is also possible for the positions of the two pivot axes to be correspondingly adjusted, in particular in continuous fashion, by means of in each case at least one driveable eccentric arrangement, which is associated with an even more extensive reduction of the generation of noise associated with the turnover of plate-shaped bodies, and an even more durable design of the system according to the invention. The at least one driveable eccentric arrangement may be driven by means of an electric, hydraulic or pneumatic drive device.

In an advantageous refinement, the driveable eccentric arrangement has a positionally fixedly arranged turnover device shaft and at least one driveable eccentric bushing which is arranged on the turnover device shaft by means of at least one radial bearing, wherein one of the turnover device arms is connected to the driveable eccentric bushing by means of at least one radial bearing. The driveable eccentric arrangement may have a driveable eccentric bushing for each turnover device arm connected to the turnover device shaft, wherein the eccentric bushings are driveable in a synchronized manner or independently of one another. The latter makes possible a simultaneous turnover of plate-shaped bodies with different dimensions (length, thickness, width) by means of the system. When the eccentric bushing is driven, it is rotated about the positionally fixedly arranged turnover device shaft. Here, "positionally fixedly arranged" means that the turnover device shaft does not change its spatial position but may be arranged so as to be rotatable about its longitudinal central axis. At least one of the radial bearings may be in the form of a radial plain bearing or in the form of a radial rolling bearing.

In an alternative advantageous refinement, the driveable eccentric arrangement has a driveable turnover device shaft, which is arranged positionally fixedly and so as to be rotatable about its longitudinal central axis, and at least one eccentric body, which is arranged on the turnover device shaft and which is connected rotationally conjointly to the turnover device shaft, wherein one of the turnover device arms is connected to the eccentric body by means of at least one radial bearing. The driveable eccentric arrangement may have an eccentric body for each turnover device arm connected to the turnover device shaft, which eccentric bodies are movable in a synchronized manner by virtue of the turnover device shaft being driven. The radial bearing may be in the form of a radial plain bearing or in the form of a radial rolling bearing. As an alternative to this refinement of the system, the driveable turnover device shaft may be formed in the manner of a crankshaft with at least one crank pin on which at least one turnover device arm is arranged movably by means of at least one radial bearing.

A further advantageous refinement provides that the system has at least one measurement unit for measuring the respective thickness of the plate-shaped body to be turned over, and at least one set of system electronics which is connectable in terms of communication to the measurement unit, wherein the set of system electronics is set up to drive the driveable eccentric arrangement as a function of the respectively measured thickness of the plate-shaped body to be turned over. In this way, after detection of the respective thickness of the plate-shaped body to be turned over, a fully automated turnover process can be performed by means of the system, in which a spacing between the pivot axes is set which is optimal with regard to the respectively measured thickness of the plate-shaped body. The set of system electronics may be formed separately or may be integrated into a set of electronics of an inspection line. A corresponding measurement unit is expedient in particular if the system is designed as a separate stand-alone system. If the system is integrated into an inspection line, the measurement unit can be dispensed with, because the respective thickness of the plate-shaped body to be turned over can be transmitted to the system by means of a material tracking system of a superordinate controller. Nevertheless, a system integrated into an inspection line may have a corresponding measurement unit.

It is furthermore advantageous if the system has at least two turnover device arms which are arranged so as to be pivotable about one of the pivot axes, wherein each turnover device arm is assigned a dedicated actuable drive unit, which drive units are actuable independently of one another, and by means of the actuation of which the respective turnover device arm can be pivoted about the pivot axis. In this way, a sufficient number of turnover device arms can be used for turning over a plate-shaped body, whereas the other turnover device arms that are pivotable about the same pivot axis are not involved in the turnover process. The actuable drive units may be of electric, hydraulic or pneumatic design.

The system advantageously has at least two turnover device arms which are arranged so as to be pivotable about one of the pivot axes and which are immovably connected to one another by means of at least one connecting element, wherein at least one mechanical damping element is arranged on a side, facing toward the plate-shaped body to be turned over, of the connecting element. By means of the connecting element, it is possible for two or more turnover device arms to be combined to form a group. The turnover device arms may also be immovably connected to one another by means of two or more connecting elements. By means of the damping element, it is possible to avoid a situation in which a plate-shaped body, for example in the form of a sheet, is caused to oscillate during its turnover process; this would be associated with a generation of noise, which must be avoided. Such oscillations can be dampened by means of the damping element. The damping element may be formed at least partially from an elastomer. It is also possible for two or more damping elements to be correspondingly used for damping the vibrations of the plate-shaped body.

In a further advantageous refinement, the system comprises at least two driveable eccentric arrangements
which have in each case one positionally fixedly arranged turnover device shaft on which in each case at least one driveable eccentric bushing is arranged by means of at least one radial bearing, wherein in each case at least one turnover device arm is connected to the respective driveable eccentric bushing by means of at least one radial bearing, and wherein the turnover device shafts are arranged in alignment with one another, or
which have in each case one driveable turnover device shaft which is arranged positionally fixedly and so as to be rotatable about its longitudinal central axis and on which there is arranged in each case at least one eccentric body which is connected rotationally conjointly to the respective turnover device shaft, wherein in each case at least one turnover device arm is connected by means of at least one radial bearing to the respective eccentric body, and wherein the turnover device shafts are arranged in alignment with one another.

In this way, at least two eccentric arrangements that can be driven independently of one another may be arranged on the input side and/or the output side of the system, such that, with the system, it is possible for two or more plate-shaped bodies with different dimensions, in particular different thicknesses, to be turned over simultaneously. The system may also have multiple corresponding driveable eccentric arrangements.

In the method according to the invention for turning over plate-shaped bodies, in particular slabs and sheets, using a turnover system having at least one turnover device arm which is arranged so as to be pivotable about a pivot axis and which can be placed in physical contact with a flat side of a plate-shaped body to be turned over, and having at least one further turnover device arm which is pivotable about a further pivot axis and which can be placed in physical contact with a further flat side of the plate-shaped body to be turned over, wherein the two pivot axes are arranged parallel to and spaced apart from one another, it is provided that a position of at least one pivot axis is adjusted by means of at least one eccentric arrangement before and/or during a turnover process.

The advantages mentioned above with regard to the system are correspondingly associated with the method. In the method according to the invention, it is also possible for the positions of the two pivot axes to be adjusted, in particular in continuous fashion, by means of in each case at least one eccentric arrangement before and/or during a turnover process.

In an advantageous refinement, the respective thickness of the plate-shaped body to be turned over is measured, wherein the position of the pivot axis is adjusted by means of the at least one eccentric arrangement before and/or during the turnover process as a function of the measured thickness of the plate-shaped body to be turned over. The advantages mentioned above with regard to the corresponding refinement of the system are correspondingly associated with this refinement.

According to a further advantageous refinement, at least two turnover device arms which are arranged so as to be pivotable about one of the pivot axes are pivotable jointly or independently of one another about the pivot axis. The latter makes it possible for a sufficient number of turnover device arms to be used for turning over a plate-shaped body, whereas the other turnover device arms that are pivotable about the same pivot axis are not involved in the turnover process.

The invention will be discussed by way of example below with reference to the appended figures and on the basis of preferred embodiments, wherein the features illustrated below may constitute an aspect of the invention both in each case individually and in various combinations with one another. In the figures:

DETAILED DESCRIPTION OF THE INVENTION

In the figures, functionally identical components are denoted by the same reference designations.

Figure 1:
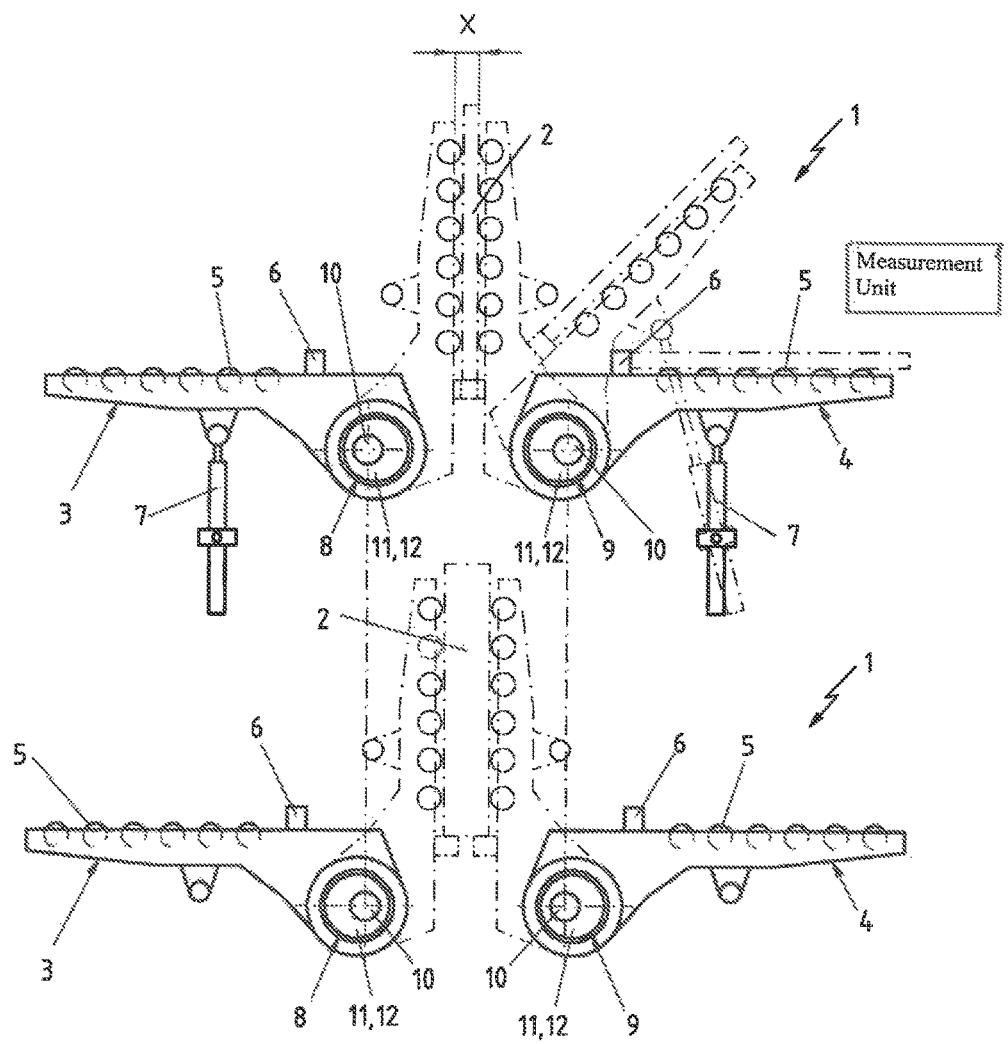
FIG. 1 is a schematic illustration of an exemplary embodiment of a system according to the invention.

FIG. 1 is a schematic illustration of an exemplary embodiment of a system 1 according to the invention during the turnover of plate-shaped bodies 2, in particular slabs and sheets, of different thickness. In an upper part of FIG. 1, the system 1 is being used to turn over a plate-shaped body 2 with a thickness considerably smaller than the thickness of the plate-shaped body 2 that is being turned over by means of the system 1 in the lower part of FIG. 1.

The system 1 comprises at least one turnover device arm 3, which is arranged so as to be pivotable about one pivot axis (not illustrated in any more detail), and at least one further turnover device arm 4, which is arranged so as to be pivotable about a further pivot axis (not shown in any more detail). The two pivot axes are arranged perpendicular to the plane of the drawing, parallel to one another, and spaced apart from one another. On each turnover device arm 3 and 4 there is arranged a multiplicity of rollers 5, the roller axes of which are arranged perpendicular to the plane of the drawing. Furthermore, on each turnover device arm 3 and 4, there are arranged lugs 6 for supporting the plate-shaped body 2 to be turned over. Each turnover device arm 3 and 4 is pivotable about the respective pivot axis by means of an actuable actuator 7, which acts on the respective turnover device arm 3 or 4 from below and is articulatedly connected to the respective turnover device arm 3 or 4.

The system 1 comprises two driveable eccentric arrangements 8 and 9, by means of which, in each case, a position of one of the pivot axes can be adjusted before and/or during a turnover process. Each driveable eccentric arrangement 8 and 9 may have a positionally fixedly arranged turnover device shaft 10 and at least one driveable eccentric bushing 11 which is arranged on the turnover device shaft 10 by means of at least one radial bearing (not shown), wherein one of the turnover device arms 3 or 4 is connected to the driveable eccentric bushing 11 by means of at least one radial bearing (not shown). Alternatively, each driveable eccentric arrangement 3 and 4 may have a driveable turnover device shaft 10, which is arranged positionally fixedly and so as to be rotatable about its longitudinal central axis, and at least one eccentric body 12, which is arranged on the turnover device shaft 10 and which is connected rotationally conjointly to the turnover device shaft 10, wherein one of the turnover device arms 3 or 4 is connected to the eccentric body 12 by means of at least one radial bearing (not shown). It is also possible for one of the driveable eccentric arrangements 8 or 9 to be designed in accordance with the first-mentioned alternative, and for the respective other driveable eccentric arrangement 9 or 8 to be designed in accordance with the second-mentioned alternative.

The system 1 may furthermore have at least one measurement unit (not shown) for measuring the respective thickness of the plate-shaped body 2 to be turned over, and at least one set of system electronics (not shown) which is connectable in terms of communication to the measurement unit, wherein the set of system electronics is set up to drive the driveable eccentric arrangements 8 and 9 as a function of the respectively measured thickness of the plate-shaped body to be turned over.

On each pivot axis there may also be provided two or more turnover device arms 3 and 4 which are arranged so as to be pivotable about the pivot axes, wherein each turnover device arm 3 and 4 is assigned a dedicated actuable drive unit, or a dedicated actuable actuator 7, which drive units or actuators are actuable independently of one another, and by means of the actuation of which drive units or actuators the respective turnover device arm 3 or 4 can be pivoted about the respective pivot axis.

A turnover process that can be performed with the system 1 will be described below. Firstly, the turnover device arms 3 and 4 are pivoted into their horizontal positions illustrated by means of solid lines. Then, the plate-shaped body 2 to be turned over can be placed onto the turnover device arm 4 and can be moved by means of the rollers 5 until it comes into physical contact with the lugs 6 arranged on the turnover device arm 4, as shown on the right in FIG. 1 by means of dashed lines. It is then possible for that flat side of the plate-shaped body 2 which is averted from the turnover device arm 4 to be inspected. Subsequently, the thickness of the plate-shaped body to be turned over can be measured. The set of system electronics thereupon drives the driveable eccentric arrangements 8 and 9 as a function of the respectively measured thickness of the plate-shaped body 2 to be turned over, in order that the driveable eccentric arrangements 8 and 9 are brought into the positions shown in the upper part of FIG. 1. Thereafter, the turnover device arms 3 and 4 can be pivoted in a synchronized manner or independently of one another, as indicated by the central position of the turnover device arm 4 as shown by dashed lines. The pivoting of the turnover device arms 3 and 4 is performed until the turnover device arms 3 and 4 have reached their vertical positions shown in the center by dashed lines, in which the transfer of the plate-shaped body 2 from the turnover device arm 4 to the turnover device arm 3 is performed. Here, the plate-shaped body 2 is supported in particular on the lugs 6 arranged on the turnover device arm 3. Finally, the turnover device arms 3 and 4 can be pivoted into their horizontal positions again, such that the turned-over plate-shaped body lies on the turnover device arm 3, and that flat side of the plate-shaped body 2 which is averted from the turnover device arm 3 can be inspected.

The lower part of FIG. 1 indicates a turnover process which can be performed by means of the system 1 and in which a plate-shaped body 2 whose thickness is considerably greater than the thickness of the plate-shaped body 2 shown in the upper part of FIG. 1 is turned over. To substantially reduce a generation of noise during the turnover process of the plate-shaped body 2, the turnover device shafts 11 or the eccentric bushings 12 have been driven so as to bring the driveable eccentric arrangements 8 and 9 into the positions shown in the lower part of FIG. 1.

Figure 2:
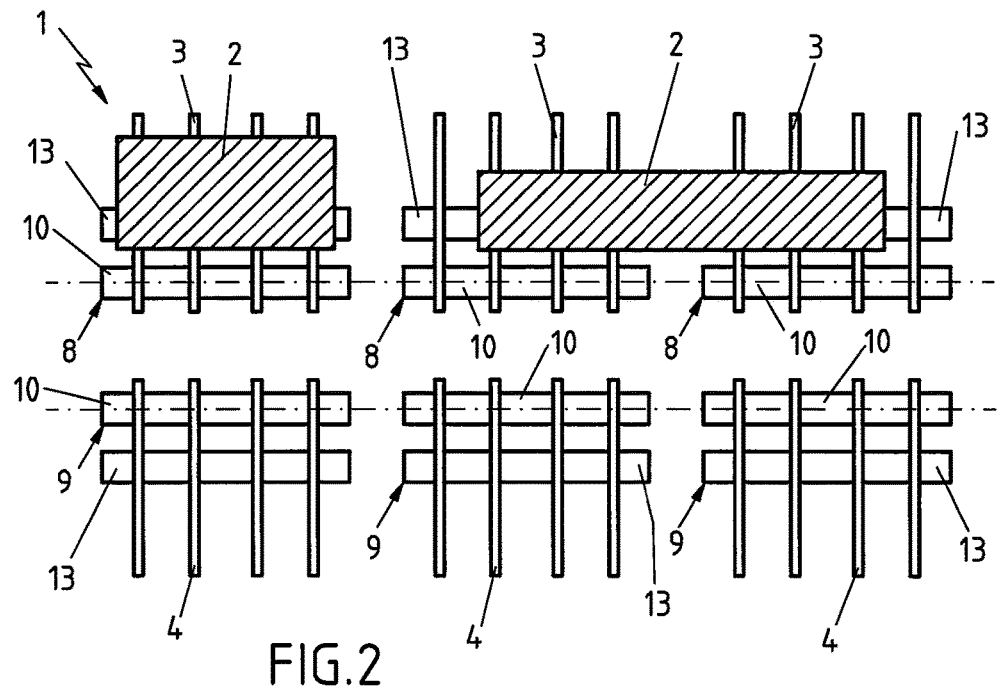
FIG. 2 is a schematic illustration of a further exemplary embodiment of a system according to the invention.

FIG. 2 is a schematic illustration of a further exemplary embodiment of a system 1 according to the invention. The system 1 comprises six mutually independently driveable eccentric arrangements 8 and 9. The driveable eccentric arrangements 8 and 9 have in each case one positionally fixedly arranged turnover device shaft 10, on which in each case four driveable eccentric bushings (not shown) are arranged by means of in each case at least one radial bearing (not shown). In each case four turnover device arms 3 and 4 are connected by means of in each case at least one radial bearing (not shown) to the respective driveable eccentric bushing. The turnover device shafts 10 are arranged in alignment with one another. Alternatively, the driveable eccentric arrangements 8 and 9 may have in each case one driveable turnover device shaft 10 which is arranged positionally fixedly and so as to be rotatable about its longitudinal central axis and on which there are arranged in each case four eccentric bodies (not shown) which are connected rotationally conjointly to the respective turnover device shaft 10, wherein in each case four turnover device arms 3 and 4 are connected in each case by means of at least one radial bearing (not shown) to the respective eccentric body, and wherein the turnover device shafts 10 are arranged in alignment with one another. The in each case four turnover device arms 3 and 4, which are mounted on the individual turnover device shafts 10, are connected immovably to one another in each case by means of a connecting element 13.

By means of the four driveable eccentric arrangements 8 and 9 illustrated on the right, or the turnover device shafts 10 and eccentric bushings or eccentric bodies thereof, and by means of the turnover device arms 3 and 4 mounted on the turnover device shafts 10, it is possible for a plate-shaped body 2 to be turned over. At the same time, by means of the two driveable eccentric arrangements 8 and 9 illustrated on the left, or the turnover device shafts 10 and eccentric bushings or eccentric bodies thereof, and by means of the turnover device arms 3 and 4 mounted on the turnover device shafts 10, it is possible for a plate-shaped body 2 to be turned over whose dimensions, in particular thickness, differ from the dimensions of the plate-shaped body 2 shown on the right.

Figure 3:
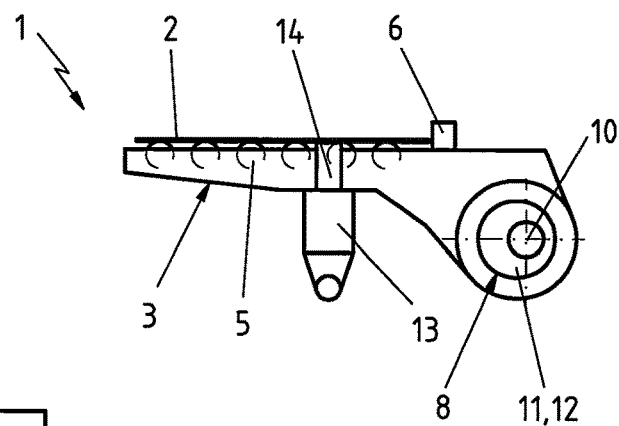
FIG. 3 is a schematic illustration of a further exemplary embodiment of a system according to the invention.

FIG. 3 is a schematic illustration of a further exemplary embodiment of a system 1 according to the invention. A detail of the system 1, as shown for example in FIG. 2, can be seen. By contrast to FIG. 2, three mechanical damping elements 14 composed of an elastomer are arranged on a side, which faces toward the plate-shaped body 2 to be turned over (not shown), of the connecting element 13.

Figure 4:
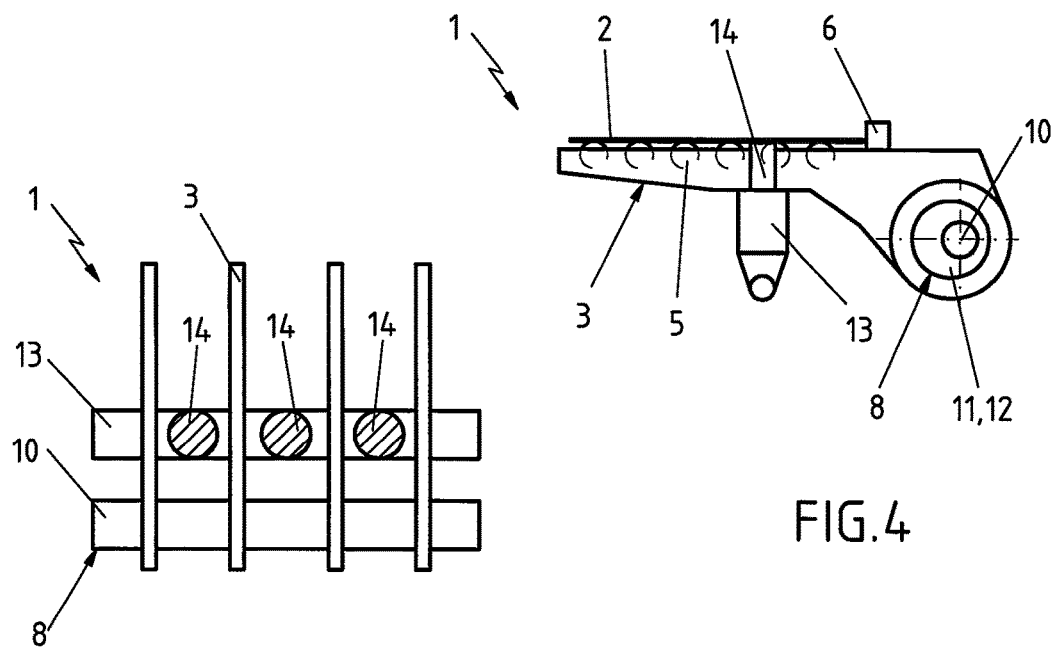
FIG. 4 is a further schematic illustration of the system shown in FIG. 3.

FIG. 4 is a further schematic illustration of the system 1 shown in FIG. 3, in the form of a side view, correspondingly to that shown in FIG. 1. A plate-shaped body 2 has been placed onto the turnover device arms 3. It can be seen that the mechanical damping elements 14 project from the connecting element 13 as far as the flat side, facing toward the turnover device arm 3, of the plate-shaped body 2. It can furthermore be seen that the turnover device arms 3 are connectable by means of the connecting element 13 to an actuable actuator (not shown) by means of which the turnover device arms 3 can be pivoted.

Figure 5:
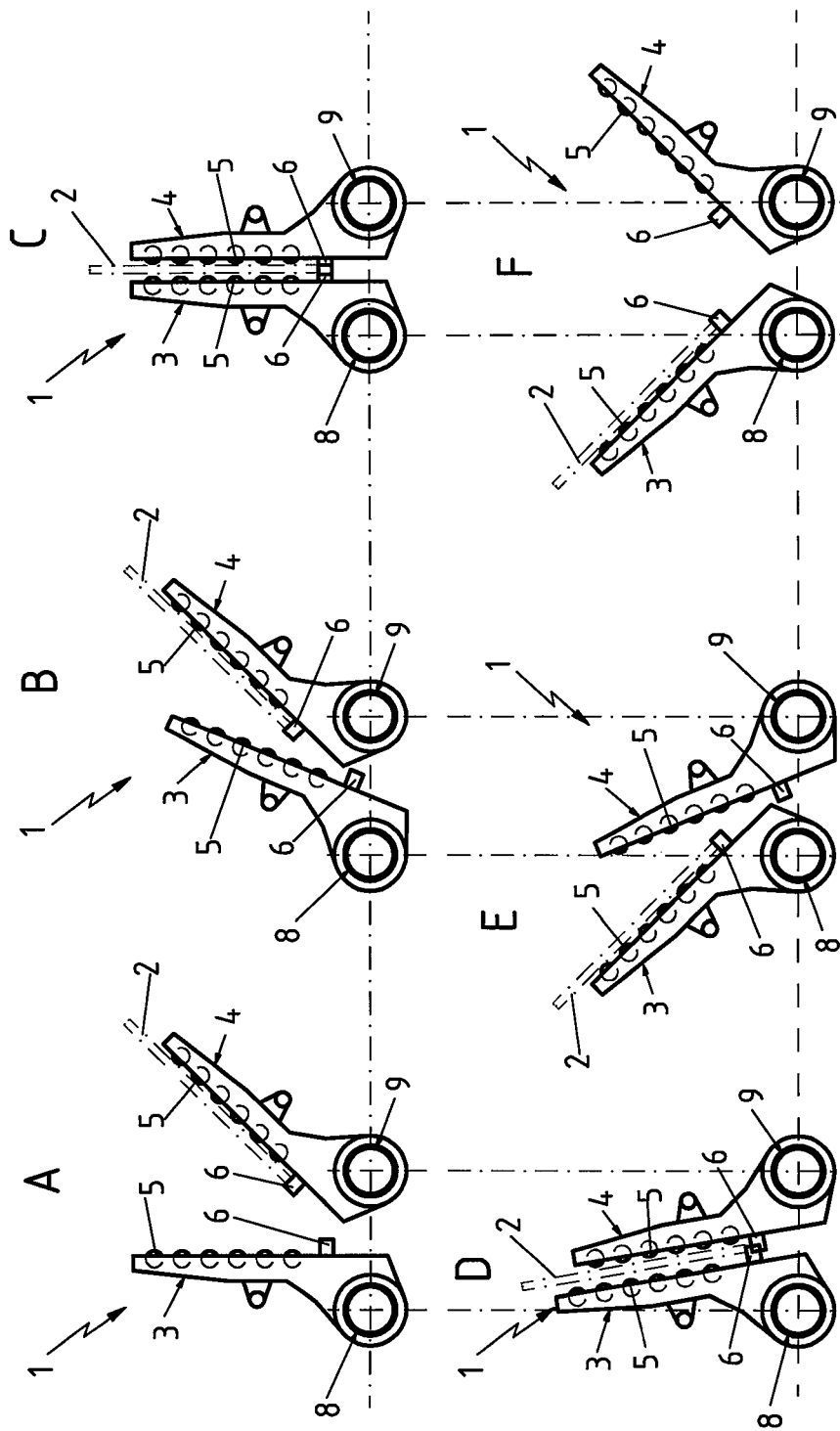
FIG. 5 is a schematic illustration of a turnover process by means of the system shown in FIG. 1.

FIG. 5 is a schematic illustration of a turnover process by means of the system 1 shown in FIG. 1. To avoid repetitions, with regard to the structure of the system 1, reference is made to the statements relating to FIG. 1. To attain the position A, the turnover device arm 3 has been pivoted into its vertical position, and the turnover device arm 4 together with the plate-shaped body 2 has been pivoted in the direction of its vertical position, wherein the eccentric arrangements 8 and 9 are situated in their neutral positions. To attain the position B, the turnover device arm 3 has been pivoted further in the direction of the turnover device arm 4, and, at the same time, the eccentric arrangements 8 and 9 have been adjusted as shown. To attain position C, the turnover device arms 3 and 4 have been pivoted into their vertical positions, and, at the same time, the eccentric arrangements 8 and 9 have been adjusted as shown. To attain the position D, the turnover device arms 3 and 4 have been pivoted counterclockwise, and, at the same time, the eccentric arrangements 8 and 9 have been adjusted as shown. To attain position E, the turnover device arms 3 and 4 have been pivoted further counterclockwise, and, at the same time, the eccentric arrangements 8 and 9 have been adjusted as shown. To attain position F, the turnover device arm 3 has been pivoted further counterclockwise and the turnover device arm 4 has been pivoted clockwise, and, at the same time, the eccentric arrangements 8 and 9 have been transferred into their neutral positions.

Figure 6:
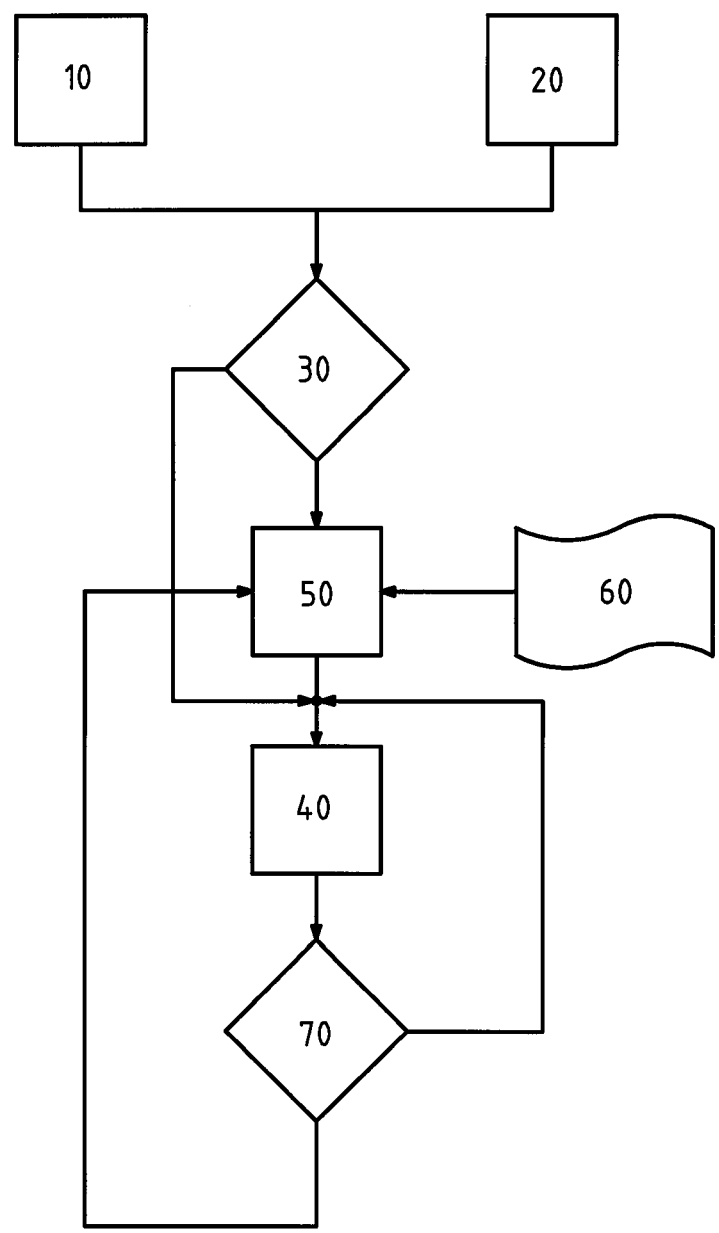
FIG. 6 is an illustration of an exemplary embodiment of a method according to the invention.

FIG. 6 is an illustration of an exemplary embodiment of a method according to the invention for turning over plate-shaped bodies (not shown), in particular slabs and sheets, using a turnover system (not shown) having at least one turnover device arm which is arranged so as to be pivotable about a pivot axis and which can be placed in physical contact with a flat side of a plate-shaped body to be turned over, and having at least one further turnover device arm which is pivotable about a further pivot axis and which can be placed in physical contact with a further flat side of the plate-shaped body to be turned over. The two pivot axes are arranged parallel to and spaced apart from one another. A position of at least one pivot axis is adjusted by means of at least one eccentric arrangement before and/or during a turnover process. In method step 10, the respective actual state of the turnover system is detected. In method step 20, parameters, such as for example a thickness, length or the like, of the plate-shaped body respectively to be turned over are detected. In method step 30, it is determined whether or not the position of the at least one eccentric arrangement is suitable for turning over the plate-shaped body. If the position of the at least one eccentric arrangement is suitable for turning over the plate-shaped body, then, in method step 40, the turnover process is started. If the position of the at least one eccentric arrangement is not suitable for turning over the plate-shaped body, the eccentric arrangement is, in method step 50, adjusted in order to assume a position optimal for the turnover of the plate-shaped body. For this purpose, in method step 50, a data matrix 60 is accessed in which relationships between parameters of plate-shaped bodies to be turned over and positions of the eccentric arrangement are stored. During the turnover process, it is monitored, in method step 70, whether or not the eccentric arrangement is optimally set for the turnover process. If the eccentric arrangement is optimally set for the turnover process, the method proceeds to method step 40. If the eccentric arrangement is not optimally set for the turnover process, the method proceeds to method step 50.

REFERENCE DESIGNATIONS

1 System
2 Plate-shaped body
3 Turnover device arm
4 Turnover device arm
5 Roller
6 Lug
7 Actuator
8 Eccentric arrangement
9 Eccentric arrangement
10 Turnover device shaft
11 Eccentric bushing
12 Eccentric body
13 Connecting element
14 Damping element

The invention claimed is:

1. A system for turning over plate-shaped bodies, comprising at least one turnover device arm arranged so as to be pivotable about a pivot axis and placeable in physical contact with a flat side of a plate-shaped body to be turned over; at least one further turnover device arm arranged so as to be pivotable about a further pivot axis and placeable in physical contact with a further flat side of the plate-shaped body to be turned over, wherein the two pivot axes are arranged parallel to and spaced apart from one another; and at least one driveable eccentric arrangement by which a position of one of the pivot axes is adjustable before and/or during a turnover process, wherein the drivable eccentric arrangement has at least one turnover device shaft and at least one eccentric member arranged on the turnover device shaft, wherein one of the turnover device arms is connected to the eccentric member.

2. The system according to claim 1, wherein the at least one turnover device shaft is positionally fixedly arranged and the at least one eccentric member is a driveable eccentric bushing rotatably arranged on the turnover device shaft, wherein the one of the turnover device arms is rotatably connected to the driveable eccentric bushing.

3. The system according to claim 1, wherein the at least one turnover device shaft is a driveable turnover device shaft arranged positionally fixedly and so as to be rotatable about its longitudinal central axis, and the at least one eccentric member is an eccentric body arranged on the drivable turnover device shaft and connected rotationally conjointly to the drivable turnover device shaft, wherein the one of the turnover device arms is rotatably connected to the eccentric body.

4. The system according to claim 1, further comprising at least one measurement unit for measuring a respective thickness of the plate-shaped body to be turned over, and at least one set of system electronics connectable in terms of communication to the measurement unit, wherein the set of system electronics is set up to drive the driveable eccentric arrangement as a function of the respectively measured thickness of the plate-shaped body to be turned over.

5. The system according to claim 1, wherein at least two of the turnover device arms are arranged so as to be pivotable about one of the pivot axes, wherein each turnover device arm is assigned a dedicated actuable drive unit, the drive units being independently actuable to pivot the respective turnover device arm about the pivot axis.

6. The system according to claim 1, wherein at least two of the turnover device arms are arranged so as to be pivotable about one of the pivot axes and are immovably connected to one another by at least one connecting element, further comprising at least one mechanical damping element is arranged on a side of the connecting element facing toward the plate-shaped body to be turned over.

7. The system according to claim 1, comprising at least two driveable eccentric arrangements that each have one positionally fixedly arranged turnover device shaft on which in each case at least one driveable eccentric bushing is arranged by at least one radial bearing, wherein in each case at least one turnover device arm is connected to the respective driveable eccentric bushing by at least one radial bearing, and wherein the turnover device shafts are arranged in alignment with one another.

8. The system according to claim 1, comprising at least two driveable eccentric arrangements that each have one driveable turnover device shaft which is arranged positionally fixedly and so as to be rotatable about a longitudinal central axis and on which there is arranged in each case at least one eccentric body connected rotationally conjointly to the respective turnover device shaft, wherein in each case at least one turnover device arm is connected by at least one radial bearing to the respective eccentric body, and wherein the turnover device shafts are arranged in alignment with one another.

9. A method for turning over plate-shaped bodies, comprising the steps of: turning a plate-shaped body with a turnover system having at least one turnover device arm which is arranged so as to be pivotable about a pivot axis and which can be placed in physical contact with a flat side of the plate-shaped body to be turned over, and having at least one further turnover device arm which is pivotable about a further pivot axis and which can be placed in physical contact with a further flat side of the plate-shaped body to be turned over, wherein the two pivot axes are arranged parallel to and spaced apart from one another; and, adjusting a position of at least one of the pivot axes by at least one eccentric arrangement before and/or during a turnover process, the method further including measuring a respective thickness of the plate-shaped body to be turned and adjusting the position of the pivot axis by the at least one eccentric arrangement before and/or during the turnover process as a function of the measured thickness of the plate-shaped body to be turned over.

10. The method according to claim 9, wherein at least two turnover device arms which are arranged so as to be pivotable about one of the pivot axes are pivotable jointly or independently of one another about the pivot axis.

* * * * *